Feb. 16, 1937. HANS-JOACHIM HENNING 2,070,731
DEVICE FOR MEASURING THE ELASTIC PROPERTIES OF MATERIALS
Filed Jan. 25, 1935 2 Sheets-Sheet 1
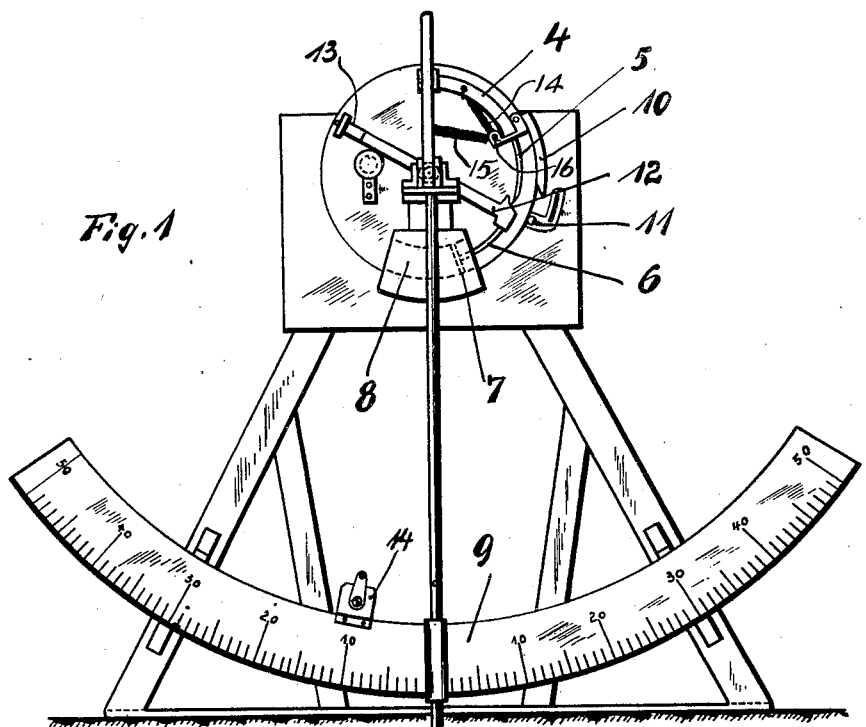
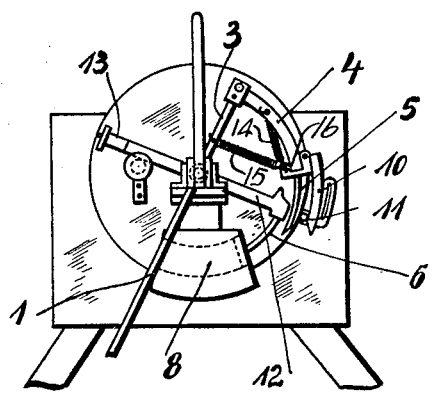
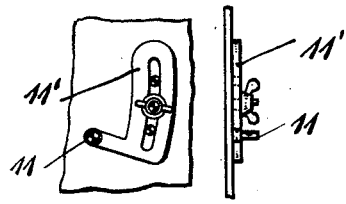
Inventor:
Hans-Joachim Henning.

Patented Feb. 16, 1937

2,070,731

UNITED STATES PATENT OFFICE 2,070,731

DEVICE FOR MEASURING THE ELASTIC PROPERTIES OF MATERIALS

Hans-Joachim Henning, Leipzig, Germany, assignor to Rudolf Knote, Leipzig, Germany Application January 25, 1935, Serial No. 3,460
In Germany February 14, 1934

4 Claims. (Cl. 265—13)

This invention relates to a device for measuring the elastic properties of materials.

The measurement of such properties plays an important part in the arts, and numerous devices have been proposed for measuring the elasticity of metals, wood, stones, artificial substances, textile fibers and goods, rubber, resins, varnishes of natural and artificial origin, etc. These devices, however, are suited only for certain limited ranges of elasticity, and apparatus applicable to a great variety of tests of elasticity including the measurement of some elasticities which could not be ascertained hitherto is not known. For example, it has not been possible till now to satisfactorily ascertain the elasticity of textiles, paper, hair, cotton-wool, etc., that is to say, the capability of a strained body of these materials to return to its former shape after being deformed.

The known devices for measuring the elastic properties of materials are further open to the objection that the test piece is stressed only once during each test and one has to rely on the effect of this single stressing action or take the average of a series of repeatedly made tests.

The invention practically overcomes these disadvantages by providing a device which is applicable to a great variety of tests of elasticity and which by a single operation directly yields a result representing the average of a series of individual measurements.

According to the invention, a swinging pendulum acts through the medium of controlling means upon the test piece by a piston. The controlling means connect the pendulum and the piston at an adjustable point and sever this connection at another adjustable point, so that the amount of work done on the test piece during the swings of the pendulum, i. e., the work done between the beginning and end of engagement of the pendulum and piston, is always the same. The power by which the material opposes deformation acts against the attacking force, whereby the total work of the pendulum is reduced resulting in a loss in amplitude, so that the pendulum approaches a position of rest more quickly than if swinging freely. This decrease in amplitude furnishes a basis for calculating the elasticity of the material.

By way of example, the invention is illustrated in the accompanying drawings without being restricted to the embodiment shown.

Figure 1 is an elevation of the device ready for compression.

Fig. 2 is a partial view of the arrangement of the pendulum and of the pressure members, with the piston and pendulum disconnected.

Fig. 4 is a partial view of the arrangement for disconnecting the piston and pendulum.

Figure 3:
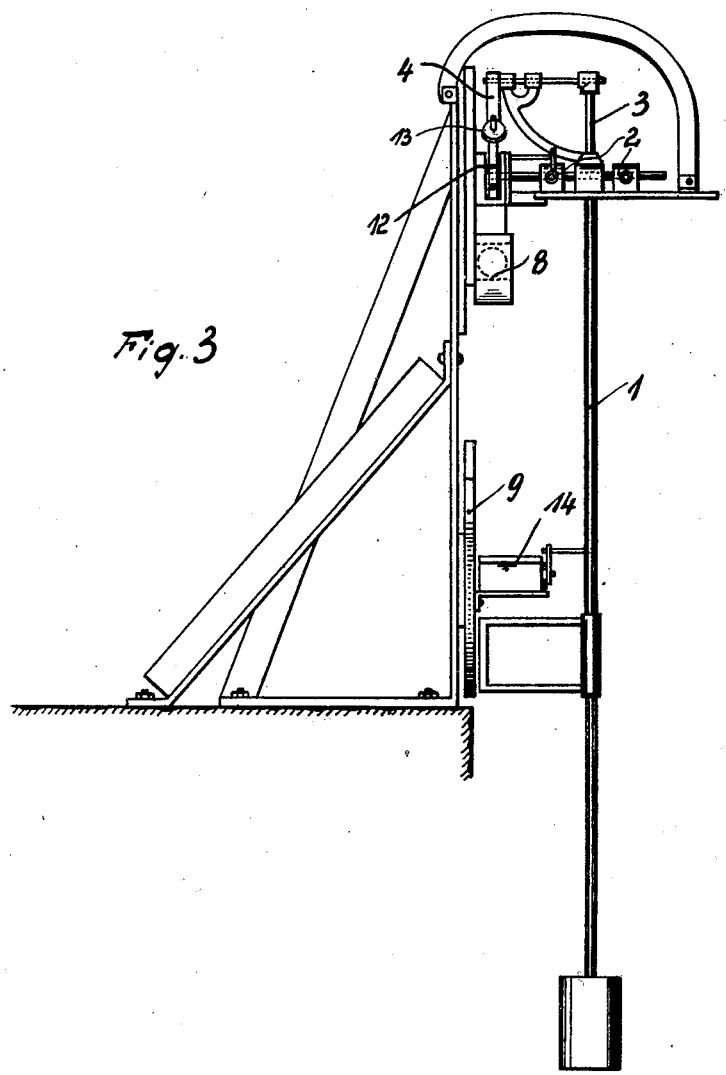
Fig. 3 is a side view of the device.

Referring to the drawings, to the top of a frame a forwardly projecting carrier is secured provided with two ball bearings 2, in which on a cross member the pendulum 1 moves. The part 3 of the pendulum 1 disposed above this bearing holds at a certain distance from the pendulum 1 an arcuate rod 4 the free end of which is connected by a joint with a U-shaped member possessing the arcuate members 5 and 10. Said U-shaped member has at the head a projection 16. Said projection is held by the force of two springs 14 and 15, whereby the spring 15 is fastened on the part 3 and the spring 14 on the arcuate rod 4. The free sharpened end of the member 5 held by said springs 15 and 14 is adapted to place itself on the sloping end 12 of a double lever 12, 13 coaxially disposed with the pendulum 1 and movably riding on the extended cross axis of the pendulum, which can move in the bearings 2. The double lever carries at its end 12, by means of the arcuate rod 6, the piston 7 which is capable of compressing a test piece in the casing 8. The end 13 of the double lever 12, 13 carries an adjustable weight for balancing the weight of the interchangeable parts 6 and 7.

The carrier secured to the top of the frame is fitted with a screw to which a thumb-nut can be attached by means of which a frame 11' movable in a slot above said screw can be fixed as desired. An extension of the frame 11' carries a horizontal pin 11 on which a roll moves and which can be fixed at any point in the path of motion of the member 10. When the free sloping end of the member 10 engages the roll of the pin 11, the U-shaped part with the free members 5 and 10 will be tilted against the force of said springs 15 and 14 outside on the part 4, so that the free end of the member 5 during its motion with the pendulum 1 cannot further move the double lever 12, 13. Although the pendulum continues to swing, it cannot do any work on the test piece in the casing 8.

The frame of the device is provided with a scale 9 over which the pendulum moves. The scale 9 has an adjustable and fixable counter 14 which by means of the pin 16 counts each motion of the pendulum 1.

The measuring operation is as follows:

A piece of the material to be tested is placed in the casing 8 and the pin 11, according to the range to be measured and the nature of the material, is placed at a certain point and fixed. The pendulum 1 is lifted to the right to a certain mark and then released to cause it to swing. The free end of the member 5 engages the end 12 of the double lever 12, 13, and the material in the casing 8 is compressed by the piston 7 until by engagement of the roll of the pin 11 by the member 10 the connection between the member 5 and the double lever 12, 13 is interrupted. During the further motion and the return of the pendulum 1 no more work is done thereby on the material, the process described being repeated only when the pendulum starts its next oscillation and the member 5 engages the member 12. The force expended by the material in resisting compression causes a continual decrease in the amplitude of the swings of the pendulum 1. After some time or after a certain number of oscillations the pendulum will thus fail to pass the counter 14, and the measurement is completed. The lower the elasticity of the material the longer will the pendulum continue to swing and the more slowly will the amplitude decrease.

I claim:—

1. In a device of the kind described the combination of a frame, a pendulum swinging in said frame, a carrier at the upper shorter end of the pendulum, a U-shaped member movably secured to the end of said carrier, a double lever coaxially arranged with the pendulum, a piston carried by one end of the double lever and adapted to be engaged by a side member of said U-shaped member to follow the motion of the pendulum, and a casing adapted to receive said piston for the compression of material in said casing.

2. In a device of the kind described the combination of a frame, a pendulum swinging in this frame, a carrier at the upper shorter end of the pendulum, a U-shaped member articulated to the end of said carrier, a piston adapted to be engaged by one side member of said U-shaped member to follow the motion of the pendulum, a casing adapted to receive said piston for the compression of material in said casing, a pin adjustably secured to the frame and adapted during engagement of the other free side member of said U-shaped member to turn the latter in the joint of said carrier, thereby disengaging the U-shaped member and the piston.

3. In a device of the kind described the combination of a frame, a pendulum swinging in this frame, a carrier at the upper shorter end of the pendulum, a U-shaped member articulated to the end of said carrier, a piston adapted to be engaged by one side member of said U-shaped member to follow the motion of the pendulum, a casing adapted to receive said piston for the compression of material in said casing, a pin adjustably secured to the frame and adapted during engagement of the other free side member of said U-shaped member to turn the latter in the joint of said carrier, thereby disengaging the U-shaped member and the piston, and a scale on the frame for indicating the deflection of the pendulum.

4. In a device of the kind described the combination of a frame, a pendulum swinging in this frame, a carrier at the upper shorter end of the pendulum, a U-shaped member articulated to the end of said carrier, a piston adapted to be engaged by one side member of said U-shaped member to follow the motion of the pendulum, a casing adapted to receive said piston for the compression of material in said casing, a pin adjustably secured to the frame and adapted during engagement of the other free side member of said U-shaped member to turn the latter in the joint of said carrier, thereby disengaging the U-shaped member and the piston, a scale on the frame for indicating the deflection of the pendulum, and a counter adjustably secured to said scale for counting each passage of the pendulum.

HANS-JOACHIM HENNING.